(12) United States Patent
Yang

(10) Patent No.: US 6,886,405 B2
(45) Date of Patent: May 3, 2005

(54) CAPACITIVE ACCELERATION SENSOR

(75) Inventor: Chien-Sheng Yang, Taipei (TW)

(73) Assignee: AU Optronics Corp., Hsin-Chin (TW)

(*) Notice: Subject to any disclaimer, the term of this patent is extended or adjusted under 35 U.S.C. 154(b) by 0 days.

(21) Appl. No.: 10/604,855

(22) Filed: Aug. 21, 2003

(65) Prior Publication Data
US 2004/0237650 A1 Dec. 2, 2004

(30) Foreign Application Priority Data
May 28, 2003 (TW) .......................... 92114482 A

(51) Int. Cl.⁷ ........................................... G01P 15/125
(52) U.S. Cl. ................................................. 73/514.32
(58) Field of Search .......................... 73/514.32, 514.36, 73/514.18, 514.21; 361/280

(56) References Cited

U.S. PATENT DOCUMENTS

| | | | | |
|---|---|---|---|---|
| 4,873,868 A | * | 10/1989 | Pierre et al. | 73/514.32 |
| 5,604,313 A | * | 2/1997 | Cahill et al. | 73/514.32 |
| 5,780,727 A | * | 7/1998 | Gimzewski et al. | 73/514.36 |
| 5,792,954 A | * | 8/1998 | Corkum et al. | 73/514.32 |
| 5,801,313 A | * | 9/1998 | Horibata et al. | 73/514.32 |
| 6,263,735 B1 | * | 7/2001 | Nakatani et al. | 73/514.32 |
| 6,796,181 B2 | * | 9/2004 | Tanaka et al. | 73/514.34 |

FOREIGN PATENT DOCUMENTS

TW          230237          9/1994

* cited by examiner

Primary Examiner—John E. Chapman
(74) Attorney, Agent, or Firm—Winston Hsu

(57) ABSTRACT

A capacitive acceleration sensor includes a non-single-crystal-silicon-based substrate, a polysilicon beam structure having a movable section that includes a movable electrode, a polysilicon supporter positioned on the non-single-crystal-silicon-based substrate for fixing the beam structure and forming a distance between the beam structure and the non-single-crystal-silicon-based substrate, a stationary electrode positioned on the non-single-crystal-silicon-based substrate and opposite to the movable section of the beam structure, and a thin film transistor (TFT) control circuit positioned on the non-single-crystal-silicon-based substrate. The stationary electrode and the movable electrode constitute a plate capacitor, and the TFT control circuit is electrically connected to the plate capacitor.

23 Claims, 3 Drawing Sheets

CAPACITIVE ACCELERATION SENSOR

BACKGROUND OF INVENTION

1. Field of the Invention

The present invention relates to an acceleration sensor, and more specifically, to a capacitive acceleration sensor CAS) with a low production cost for meeting market requirements.

2. Description of the Prior Art

An acceleration sensor is widely applied in seismology, automobile safety air bag, robotics, and so on. Currently, an acceleration sensor in common use includes a piezoresistive acceleration sensor, a piezoresistive acceleration sensor, a capacitive acceleration sensor, and a semiconductor acceleration sensor.

Additionally, because sizes of the acceleration sensors are reduced gradually, a micromachining technology is developed to manufacture various microsensors and microactuators that are integrated with micro electronic circuits to form a microsystem, which is generally called a micro electromechanical system (MEMS). The MEMS has an extremely small size and can be manufactured by utilizing batch production for reducing a production cost. In addition, the MEMS and a signal processing circuit can be simultaneously formed on a silicon wafer for forming a monolithic device, which can reduce a distance between an acceleration sensor and the signal Processing circuit and that is quite important for the acceleration sensor. As the acceleration sensor outputs a signal, the signal is firstly amplified by the signal processing circuit for preventing the signal from being disturbed by an ambient electromagnetic field, and the signal can be analog-to-digital (AID) converted by the signal processing circuit and be transmitted to a central processing unit. Therefore, as the distance between the acceleration sensor and the signal processing circuit is reduced, signal reliability can be greatly improved, and interconnecting lines and loads of central control systems can be effectively decreased. As a result, the acceleration sensor that is manufactured by use of MEMS is developed rapidly due to its advantages of good detection sensitivity and a low production cost. Additionally, among the above-mentioned kinds of acceleration sensors, the capacitive acceleration sensor has advantages of high detection sensitivity and low sensitivity to an ambient environment so that the capacitive acceleration sensor has become more and more popular in a market.

Please refer to FIG. 1. FIG. 1 is a sectional view of a conventional capacitive acceleration sensor 10. As shown in FIG. 1, the capacitive acceleration sensor 10 mainly comprises a semiconductor substrate 12, such as a single-crystal silicon substrate or a silicon-on-insulator (SOI) substrate, an epitaxial-silicon beam structure 14 having a movable section where a movable electrode 16 is located, an epitaxial-silicon supporter 18 formed on the semiconductor substrate 12 for fixing the beam structure 14 and forming a distance between the beam structure 14 and the semiconductor substrate 12, and a doped region 20 positioned in the semiconductor substrate 12 and below the moveable electrode 16. The movable electrode 16 and the doped region 20 together constitute a plate capacitor 22, and the movable electrode 16 functions as an upper electrode of the plate capacitor 22 while the doped region 20 is used as a lower electrode or a stationary electrode of the plate capacitor 22. Additionally, the capacitive acceleration sensor 10 further comprises a control circuit 24, such as a complementary metal-oxide semiconductor (CMOS) control circuit, positioned in the supporter 18 or on the semiconductor substrate 12. The CMOS control circuit 24 is electrically connected to the plate capacitor 22 and is mainly used to receive, process, and transmit signals output from the plate capacitor 22.

When a vertical acceleration force is applied on the capacitive acceleration sensor 10, a flexural vibration occurs in the movable section of the beam structure 14, thereby altering a capacitance of the plate capacitor 22. Thereafter, the control circuit 24 receives a signal output from the plate capacitor 22 and performs a signal process, such as signal amplification or temperature compensation, on the signal. Then, the control circuit 24 converts the signal output from the plate capacitor 22 into a differential signal that is eventually output from the control circuit 24. Since the differential signal corresponds to the applied acceleration force, the capacitive acceleration sensor 10 can utilize the CMOS control circuit 24 to detect variations of an electrostatic capacitance of the plate capacitor 22 for obtaining the applied acceleration force. Moreover, the capacitance of the plate capacitor 22 is only relative to physical parameters, so that the capacitive acceleration sensor 10 can be formed with a material having a low thermal expansion coefficient for improving its detection sensitivity.

As described above, the semiconductor substrate 12, the beam structure 14, and the supporter 18 are composed of single-crystal silicon or epitaxial silicon, so that the conventional capacitive acceleration sensor 10 has good detection sensitivity. However, costs of silicon wafers and epitaxial silicon are so high that it costs a lot to form the conventional capacitive acceleration sensor 10. As a result, it is an important issue to manufacture a capacitive acceleration sensor with a low production cost and a high quality.

SUMMARY OF INVENTION

It is therefore a primary objective of the claimed invention to provide a capacitive acceleration sensor with a low production cost.

According to the claimed invention, a capacitive acceleration sensor is provided. The capacitive acceleration sensor comprises a non-single-crystal-silicon-based substrate, a polysilicon beam structure having a movable section that includes a movable electrode, a polysilicon supporter positioned on the non-single-crystal-silicon-based substrate for fixing the beam structure and forming a distance between the beam structure and the non-single-crystal-silicon-based substrate, a stationary electrode positioned on the non-single-crystal-silicon-based substrate and opposite to the movable section of the beam structure, and a thin film transistor (TFT) control circuit positioned on the non-single-crystal-silicon-based substrate. The stationary electrode and the movable electrode constitute a plate capacitor, and the TFT control circuit is electrically connected to the plate capacitor.

It is an advantage over the prior art that the capacitive acceleration sensor of the claimed invention is formed on the non-single-crystal-silicon-based substrate, such as a glass substrate or a quartz substrate, thereby effectively reducing prime costs of raw materials. Additionally, the beam structure and its supporter of the claimed invention are composed of polysilicon and are formed concurrently for reducing a production cost to meet market requirements.

These and other objectives of the present invention will no doubt become obvious to those of ordinary skill in the art after reading the following detailed description of the preferred embodiment, which is illustrated in the multiple figures and drawings.

DETAILED DESCRIPTION

Figure 1:
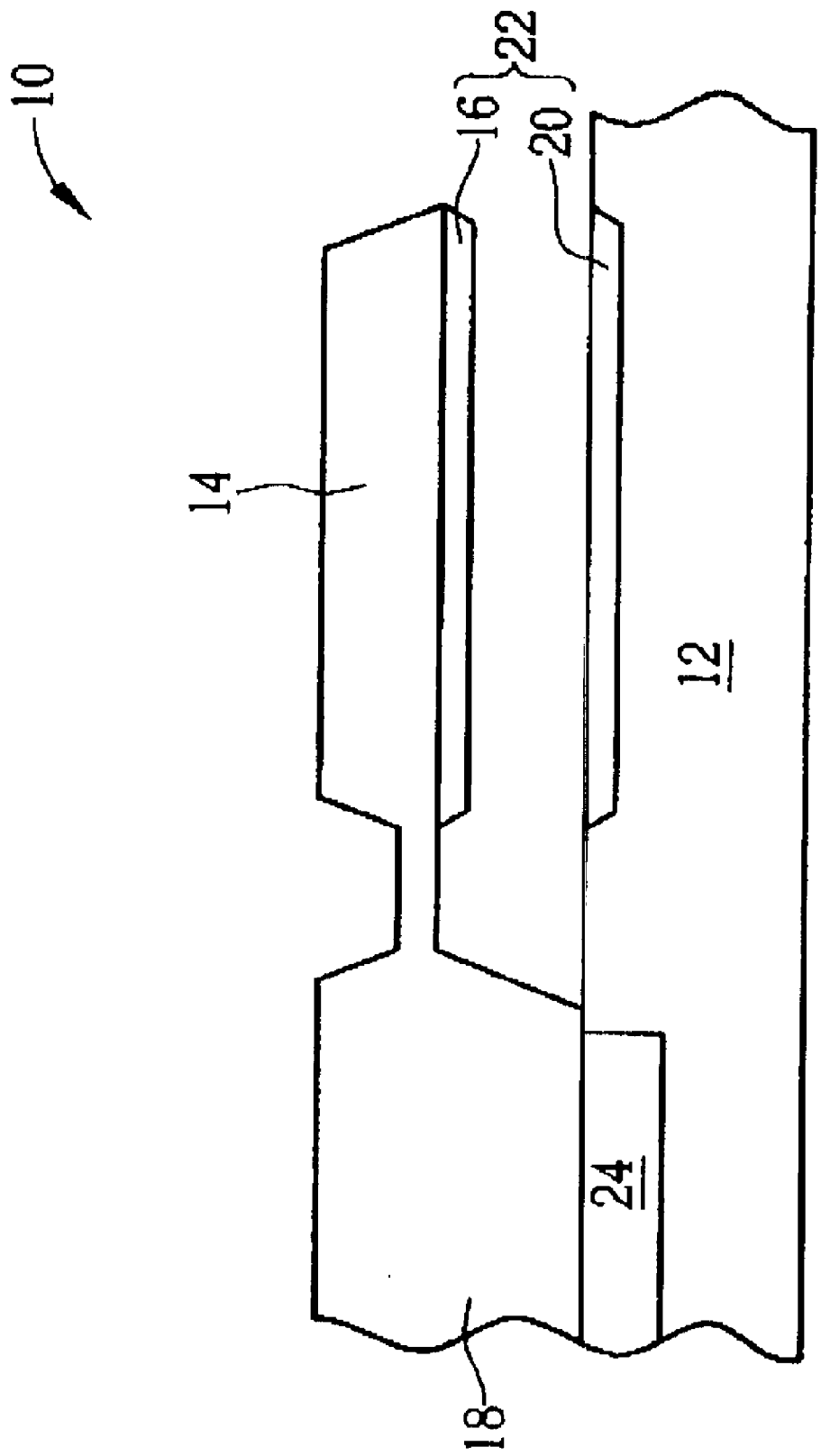
FIG. 1 is a sectional view of a conventional capacitive acceleration sensor.
Figure 2:
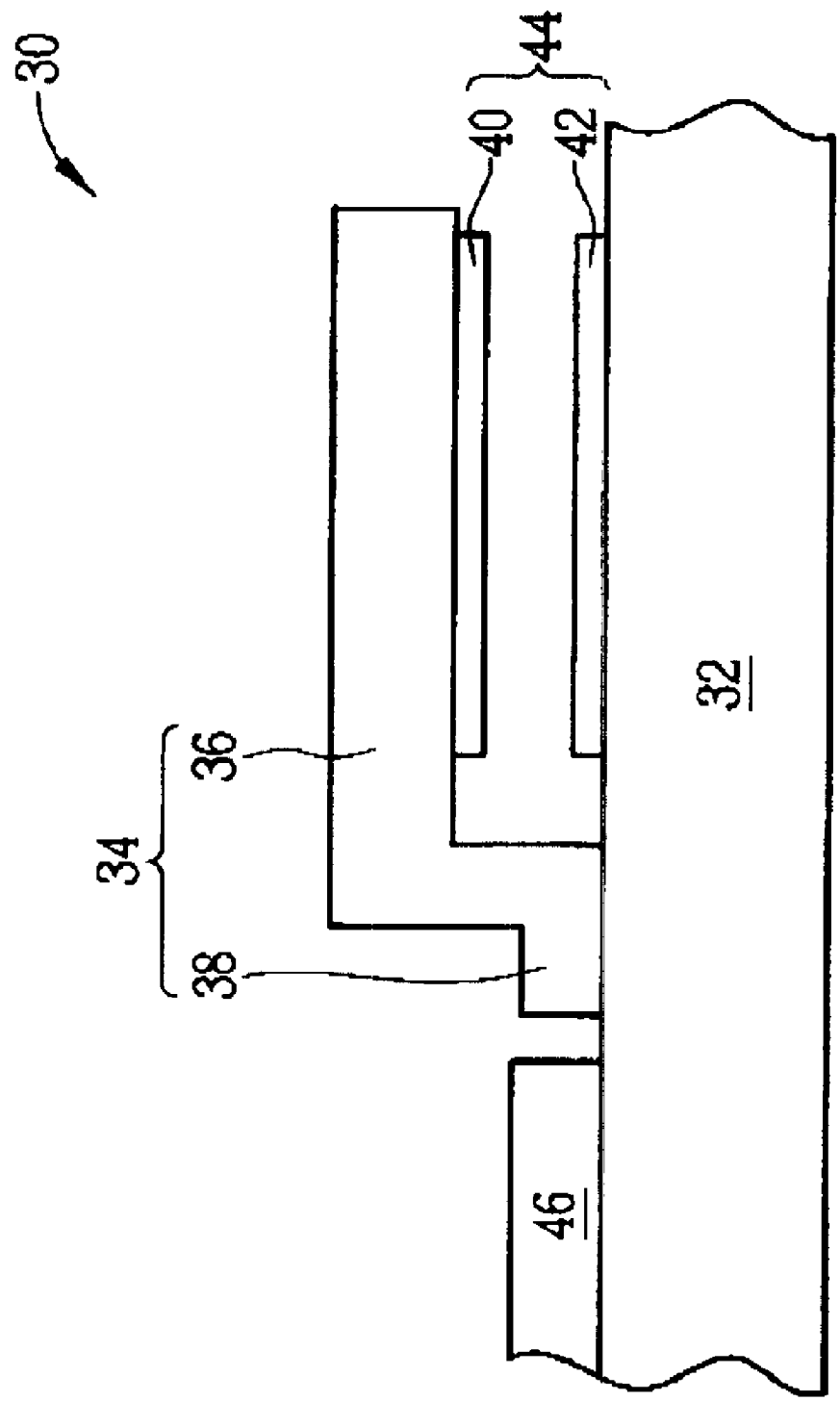
FIG. 2 is a sectional view of a capacitive acceleration sensor according to the present invention.

Please refer to FIG. 2. FIG. 2 is a sectional view of a capacitive acceleration sensor 30 according to the present invention. As shown in FIG. 2, the capacitive acceleration sensor 30 comprises a non-single-crystal-silicon-based substrate 32 and a cantilever beam structure 34. The cantilever beam structure 34 includes a polysilicon beam structure 36 having a movable section where a movable electrode 40 is located, and a polysilicon supporter 38 positioned on the non-single-crystal-silicon-based substrate 32 for fixing the beam structure 36 and forming a distance between the beam structure 36 and the non-single-crystal-silicon-based substrate 32. Additionally, the capacitive acceleration sensor 30 further comprises a stationary electrode 42 positioned on the non-single-crystal-silicon-based substrate 32 and below the movable electrode 40, and a control circuit 46, such as a thin film transistor (TFT) control circuit, positioned on the non-single-crystal-silicon-based substrate 32. Furthermore, the movable electrode 40 and the stationary electrode 42 together constitute a plate capacitor 44 of the capacitive acceleration sensor 30, and the movable electrode 40 functions as an upper electrode while the stationary electrode 42 is used as a lower electrode. The TFT control circuit 46 is electrically connected to the cantilever beam structure 34 and the plate capacitor 44, and the TFT control circuit 46 is used to receive, process, and transmit signals output from the plate capacitor 44.

When a vertical acceleration force is applied on the capacitive acceleration sensor 30, the movable electrode 40 of the cantilever beam structure 34 will receive a force in a vertical direction so that a flexural vibration occurs in the movable section of the beam structure 36, thereby changing a relative location between the movable electrode 40 and the stationary electrode 42 and altering a capacitance of the plate capacitor 44. As a distance between the movable electrode 40 and the stationary electrode 42 is shortened, the electrostatic capacitance of the plate capacitor 44 will be increased. On the contrary, when a distance between the movable electrode 40 and the stationary electrode 42 is increased, the electrostatic capacitance of the plate capacitor 44 will be decreased. As a result, the TFT control circuit 46 can be combined with a differential amplifier or other electronic devices to process a signal of a capacitance variation that is output from the plate capacitor 44 for obtaining the applied acceleration force.

In the preferred embodiment of the present invention, the non-single-crystal-silicon-based substrate 32 is composed of glass. Because the glass substrate 32 has a low melting point, the TFT control circuit 46 has to be a low temperature polysilicon (LTPS) TFT control circuit, which can be formed at a low temperature, thereby perverting the glass substrate 32 from being damaged due to a high temperature. Additionally, the non-single-crystal-silicon-based substrate 32 can be a quartz substrate in another embodiment of the present invention. Owing to a high melting point of the quartz substrate 32, the TFT control circuit 46 can be a high temperature polysilicon TFT control circuit. In addition, the polysilicon beam structure 36 and the polysilicon supporter 38 can be formed simultaneously or can be formed separately. The movable electrode 40 can be composed of doped polysilicon or other metals, and the stationary electrode 42 can be composed of aluminum (Al), titanium (Ti), platinum (Pt), or alloys.

Figure 3:
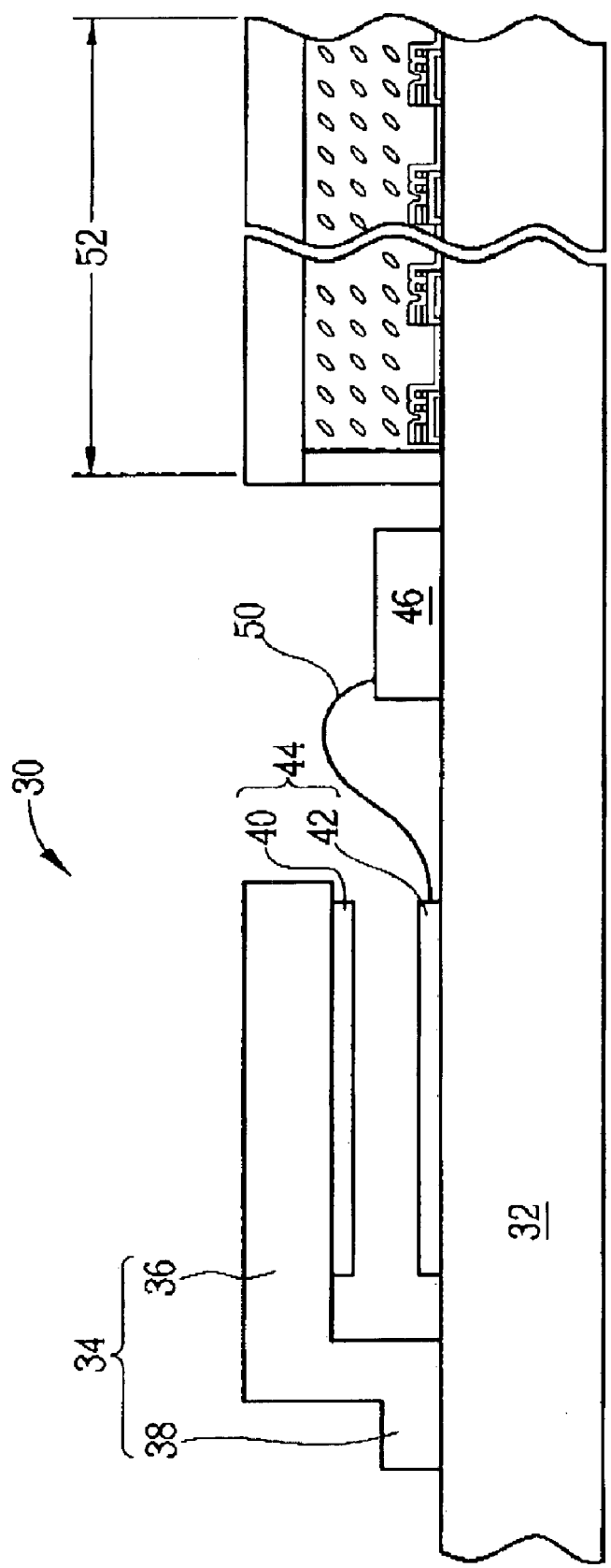
FIG. 3 is a schematic diagram of a capacitive ecceleration sensor according to another embodiment of the present invention.

It should be noticed that although the control circuit 46 is formed on the glass substrate 32 in the preferred embodiment of the present invention, the present invention is not confined to that. Please refer to FIG.3. FIG.3 is a schematic diagram of a capacitive acceleration sensor 30 accord to another embodiment of the present invention. As shown in FIG.3, the control circuit 46 is electrically connected to the plate capacitor 44 via a flexible printed circuit (FPC) board 50 Furthermore, a surface of the non-single-crystal-silicon-based substrate 32 further comprises TFT display area 52 for displaying an acceleration force detected by the capacitive acceleration sensor 30, thereby making it convenient for users to measure an acceleration force and to observe measuring results.

In comparison with the prior art, the capacitive acceleration sensor of the present invention is formed on the non-single-crystal-silicon-based substrate, such as a glass substrate or a quartz substrate, so that prime costs of raw materials can be reduced considerably. Additionally, the beam structure and its supporter of the present invention are composed of polysilicon, thereby reducing a production cost to meet market requirements and avoiding forming epitaxial silicon that requires complicated steps and parameters.

Those skilled in the art will readily observe that numerous modifications and alterations of the device may be made while retaining the teachings of the invention. Accordingly, the above disclosure should be construed as limited only by the metes and bound of the appended claims.

What is claimed is:

1. A capacitive acceleration sensor comprising:
    a non-single-crystal-silicon-based substrate;
    a polysilicon beam structure having a movable section, the movable section comprising a movable electrode;
    a polysilicon supporter positioned on the non-single-crystal-silicon-based substrate for fixing the beam structure and forming a distance between the beam structure and the non-single-crystal-silicon-based substrate;
    a stationary electrode positioned on the non-single-crystal-silicon-based substrate and opposite to the movable section of the beam structure, the stationary electrode and the movable electrode constituting a plate capacitor; and
    a thin film transistor (TFT) control circuit positioned on the non-single-crystal-silicon-based substrate and electrically connected to the plate capacitor.

2. The capacitive acceleration sensor of claim 1 wherein the non-single-crystal-silicon-based substrate is a glass substrate.

3. The capacitive acceleration sensor of claim 2 wherein the TFT control circuit is a low temperature polysilicon TFT control circuit.

4. The capacitive acceleration sensor of claim 1 wherein the non-single-crystal-silicon-based substrate is a quartz substrate.

5. The capacitive acceleration sensor of claim 4 wherein the TFT control circuit is a high temperature polysilicon TFT control circuit.

6. The capacitive acceleration sensor of claim 1 wherein the stationary electrode comprises aluminum (Al), titanium, (Ti), platinum (Pt), or alloys.

7. The capacitive acceleration sensor of claim 1 wherein the beam structure and the supporter are formed simultaneously.

8. The capacitive acceleration sensor of claim 1 wherein the movable electrode comprises doped polysilicon or a conductive material.

9. The capacitive acceleration sensor of claim 1 wherein the non-single-crystal-silicon-based substrate further comprises a thin film transistor display region for displaying a variation detected by the capacitive acceleration sensor.

10. A capacitive acceleration sensor comprising:

an insulating substrate;

a cantilever beam structure positioned on the insulating substrate having a movable section, the movable section comprising a movable electrode;

a stationary electrode positioned on the insulating substrate and opposite to the movable section of the cantilever beam structure, the stationary electrode and the movable electrode constituting a plate capacitor; and a thin film transistor control circuit positioned on the insulating substrate and electrically connected to the plate capacitor, the thin film transistor control circuit being a low temperature polysilicon thin films transistors control circuit.

11. The capacitive acceleration sensor of claim 10 wherein the stationary electrode comprises aluminum (Al), titanium (Ti), platinum (Pt), or alloys.

12. The capacitive acceleration sensor of claim 10 wherein the cantilever beam structure comprises polysilicon.

13. The capacitive acceleration sensor of claim 10 wherein the movable electrode comprises doped polysilicon or a conductive material.

14. The capacitive acceleration sensor of claim 10 wherein the insulating substrate is a glass substrate.

15. The capacitive acceleration sensor of claim 10 wherein the thin film transistor control circuit is electrically connected to the plate capacitor via a flexible printed circuit (FPC) board.

16. The capacitive acceleration sensor of claim 10 wherein the insulating substrate further comprises a thin film transistor display region for displaying a variation detected by the capacitive acceleration sensor.

17. A capacitive acceleration sensor comprising:

an insulating substrate;

a cantilever beam structure positioned on the insulating substrate having a movable section, the movable section comprising a movable electrode;

a stationary electrode positioned on the insulating substrate and opposite to the movable section of the cantilever beam structure, the stationary electrode and the movable electrode constituting a plate capacitor; and a thin film transistor control circuit positioned on the insulating substrate and electrically connected to the plate capacitor, the thin film transistor control circuit being a high temperature polysilicon thin film transistor control circuit.

18. The capacitive acceleration sensor of claim 17 wherein the stationary electrode comprises aluminum (Al), titanium (Ti), platinum (Pt), or alloys.

19. The capacitive acceleration sensor of claim 17 wherein the cantilever beam structure comprises polysilicon.

20. The capacitive acceleration sensor of claim 17 wherein the movable electrode comprises doped polysilicon or a conductive material.

21. The capacitive acceleration sensor of claim 17 wherein the insulating substrate is a quartz substrate.

22. The capacitive acceleration sensor of claim 17 wherein the thin film transistor control circuit is electrically connected to the plate capacitor via a flexible printed circuit (FPC) board.

23. The capacitive acceleration sensor of claim 17 wherein the insulating substrate further comprises a thin film transistor display region for displaying a variation detected by the capacitive acceleration sensor.

* * * * *